United States Patent [19]

Reyes

[11] Patent Number: 5,445,253
[45] Date of Patent: Aug. 29, 1995

[54] SHIFT CONTROL MECHANISM FOR A MULTI-SPEED COUNTERSHAFT TRANSMISSION

[75] Inventor: Carlos C. Reyes, Sterling Heights, Mich.

[73] Assignee: Saturn Corporation, Troy, Mich.

[21] Appl. No.: 197,094

[22] Filed: Feb. 16, 1994

[51] Int. Cl.⁶ .................. B60K 41/26; F16H 3/38
[52] U.S. Cl. ..................... 192/4 C; 74/339; 74/411.5; 192/53 F
[58] Field of Search .......... 192/4 C, 53 F, 53 G; 74/339, 411.5

[56] References Cited

U.S. PATENT DOCUMENTS

| | | | |
|---|---|---|---|
| 4,221,283 | 9/1980 | Nordkvist | 192/4 C |
| 4,463,622 | 8/1984 | Freiburger | 74/411.5 X |
| 4,467,665 | 8/1984 | Katayama et al. | 74/339 |
| 4,572,020 | 2/1986 | Katayama | 192/4 C |
| 4,889,003 | 12/1989 | Rietsch | 74/339 |

Primary Examiner—Richard M. Lorence
Attorney, Agent, or Firm—Donald F. Scherer

[57] ABSTRACT

A neutral-reverse shift control actuator is provided in a countershaft transmission. The actuator is comprised of a spring member and utilizes one of the forward ratio synchronizers. During a neutral-reverse shift maneuver, the spring member is effective to enforce engagement of the cone clutch of the forward synchronizer which, through a connection with a stationary output shaft, will retard rotation of the input shaft.

3 Claims, 2 Drawing Sheets

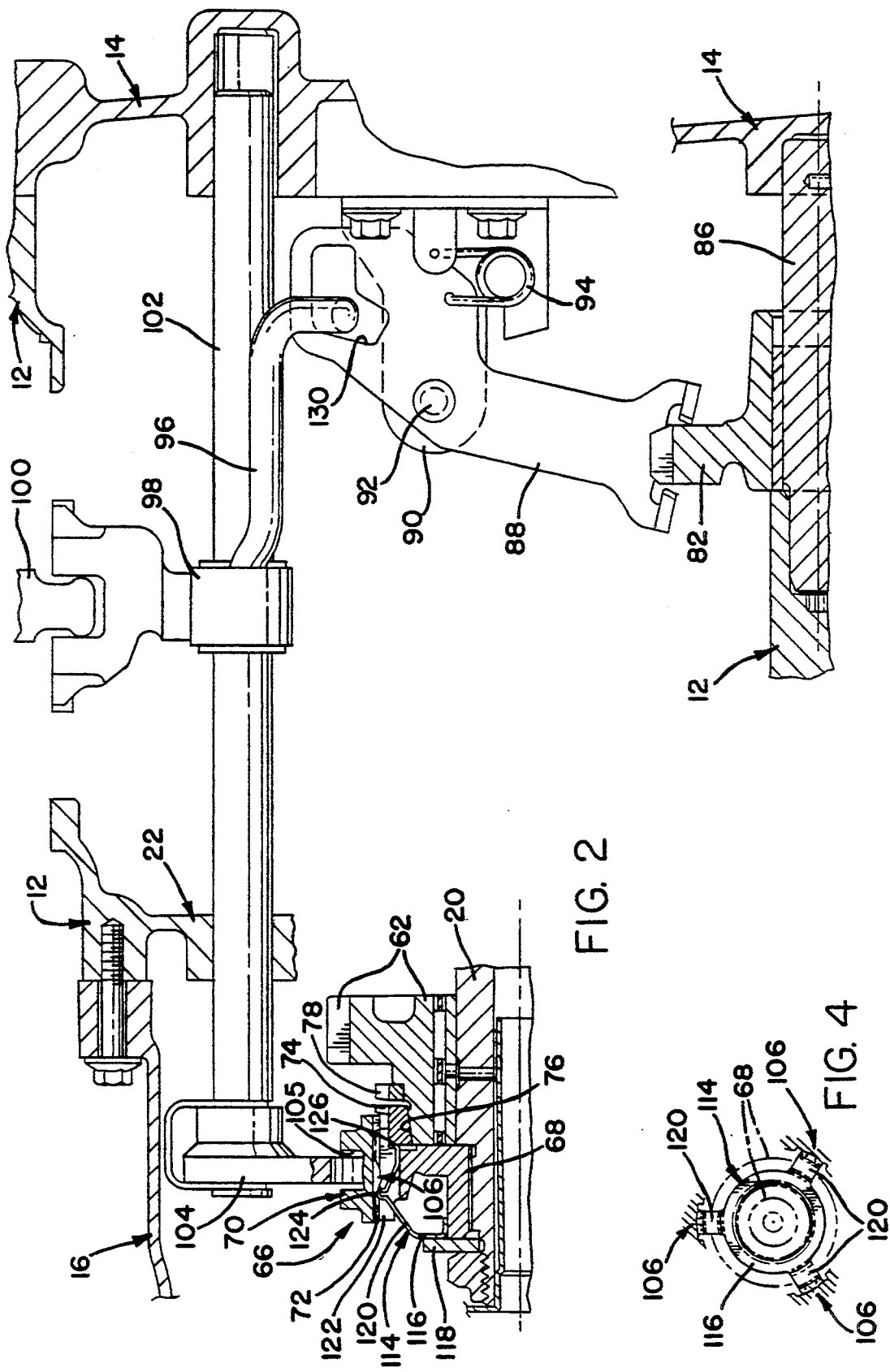

SHIFT CONTROL MECHANISM FOR A MULTI-SPEED COUNTERSHAFT TRANSMISSION

TECHNICAL FIELD

This invention relates to shift controls for power transmissions, and more particularly, to neutral-reverse controls for countershaft transmissions.

BACKGROUND OF THE INVENTION

Countershaft type transmissions have incorporated a neutral-reverse brake mechanism in the transmission by placing a cone on a stationary housing. The cone is engaged by a synchronizer cone clutch which is operated by the synchronizer sleeve of one of the forward ratio (i.e., fifth gear) synchronizer mechanisms. The engagement between the cone surface will bring the shaft, generally the input shaft, associated with the synchronizer sleeve to a halt, such that the reverse idler gear can be meshed with a pair of reverse ratio gears.

One such system is described in U.S. Pat. No. 4,598,599 to Ikemoto, issued Jul. 8, 1986. This and similar systems, require that an additional cone clutch, blocker ring and stationary cone be provided in the transmission to accomplish the braking action desired during a neutral to reverse shift. These components add to the cost and complexity of the transmission.

SUMMARY OF THE INVENTION

A neutral-reverse brake or actuator which uses a forward synchronizer mechanism is provided by the present invention. A spring member is disposed in operative relation with the cone clutch of the forward synchronizer mechanism, such that during a neutral-reverse shift, the spring member is operated on by the synchronizer sleeve to actuate the cone clutch to engage the complementary cone on a forward ratio gear, such as fifth gear. This alleviates the need to assemble additional synchronizer components that are required by the prior art.

A spring having a plurality of axially extending arms, each having an actuating section, is assembled in the synchronizer clutch sleeve of the fifth ratio synchronizer. When the transmission control is manipulated for the reverse engagement, the clutch sleeve is moved axially in a direction opposite to the fifth gear selection. The actuator sections on the spring arms are engaged with and operated by the clutch sleeve to enforce the arms to extend axially, whereby the fifth synchronizer cone clutch is engaged with the fifth ratio gear on the input shaft. This causes a braking or retarding effect at the input shaft in bringing it to a halt. Upon or near completion of the reverse engagement, the actuating sections of the spring arms are disengaged by the clutch sleeve thereby releasing the axial spring force in the fifth synchronizer cone clutch.

It is an object of this invention to provide an improved neutral-reverse shift using a forward synchronizer to control the speed of the input and output shafts during a reverse shift.

It is another object of this invention to provide an improved neutral-reverse shift control having a spring member actuated to engage one of the forward synchronizers to create a synchronizing effect between the input and output shafts of the transmission.

It is yet another object of this invention to provide an improved neutral-reverse shift actuator wherein a spring member having axially movable arms is actuated by a forward synchronizer clutch sleeve to enforce engagement of the forward synchronizer clutch, thereby retarding rotation of the transmission input shaft connected with the forward ratio gear.

These and other objects and advantages of the present invention will be more apparent from the following description and drawings.

DESCRIPTION OF THE DRAWINGS

FIG. 2 is a view taken along line 2—2 of FIG. 1.

FIG. 4 is a view taken along line 4—4 of FIG. 1.

DESCRIPTION OF AN EXEMPLARY EMBODIMENT

Figure 1:
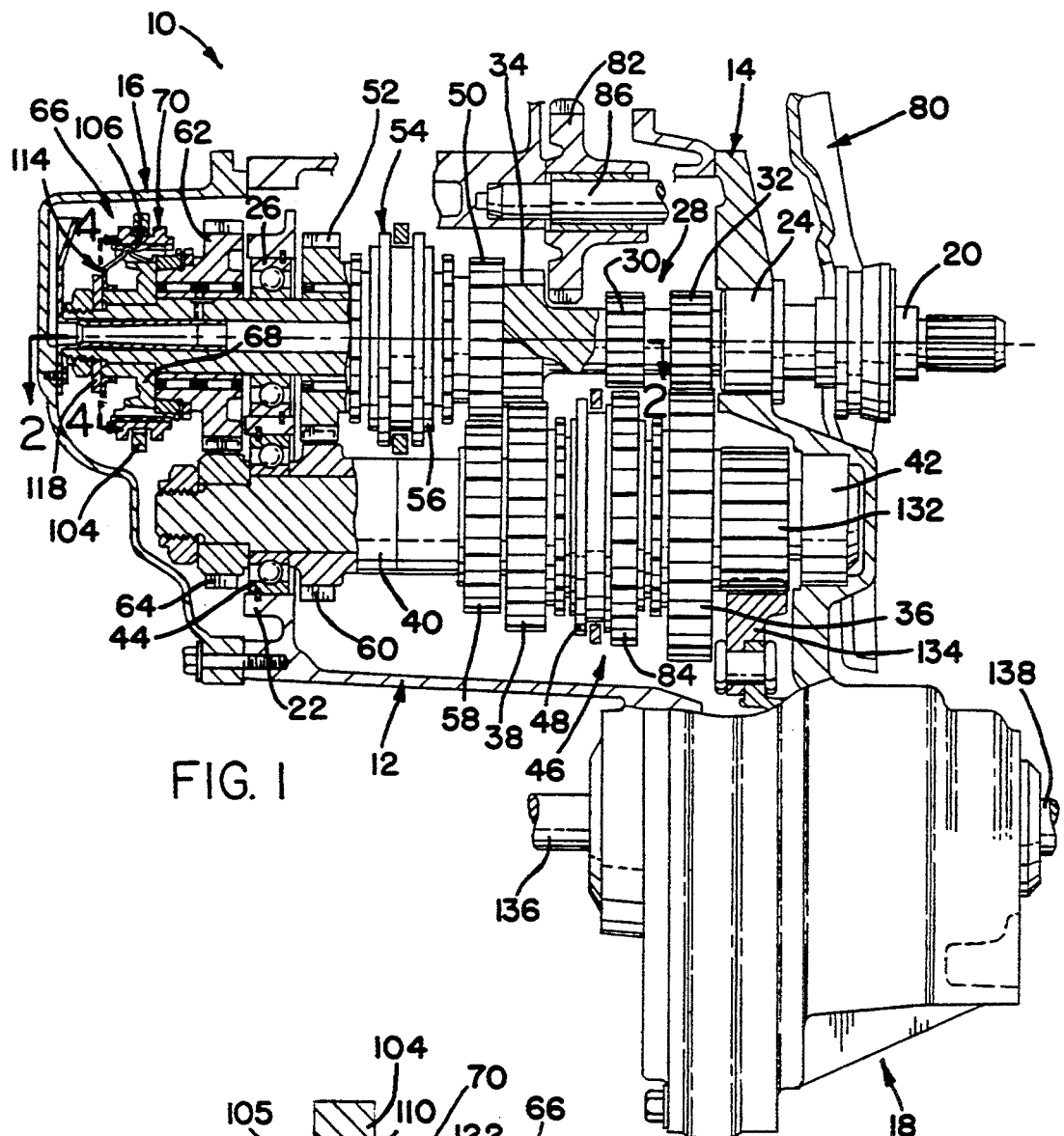
FIG. 1 is a cross-sectional elevational view of a countershaft type transmission incorporating the present invention.

A power transmission 10 having a housing 12, a front end cover 14, a rear cover 16 and a differential assembly 18 is seen in FIG. 1. The transmission 10 has an input shaft 20 rotatably supported in the housing 12 by a wall 22 and in the front cover 14. The shaft 20 is rotatably supported on conventional bearings 24 and 26. The input shaft 20 has rotatably secured thereto a cluster gear 28 which includes a reverse input gear 30, a first ratio input gear 32 and a second ratio input gear 34. The gears 32 and 34 mesh with a first ratio output gear 36 and a second ratio output gear 38, respectively, which are rotatably mounted on a transmission countershaft or output shaft 40 which is rotatably mounted in the end cover 14 by a bearing 42 and in the wall 22 by a bearing 44.

The gears 36 and 38 are operably connected with a 1–2 synchronizer assembly 46 which is selectively manipulable to control the first ratio by rightward movement of a clutch sleeve 48. Leftward movement of the clutch sleeve 48 will control engagement of the second ratio. As is well known, synchronizer assemblies, such as 46, are operable to connect the gear member with the shaft on which they are rotatably supported. The construction and operation of synchronizers, such as 46, is well known and it is not considered that a more complete description would be necessary in that persons of ordinary skill in the art will readily recognize these mechanisms and their operation.

The input shaft 20 has rotatably supported thereon a third ratio input gear 50 and a fourth ratio input gear 52 which are controlled by a conventional 3–4 synchronizer assembly 54. The synchronizer assembly 54 has a clutch sleeve 56 which when moved rightwardly will cause the third ratio gear 50 to be engaged with the input shaft 20 and leftward movement of the sleeve 56 will cause the gear 52 to be engaged with the input shaft 20. The gears 50 and 52 mesh with respective ratio output gears 58 and 60 which are rotatably secured to the output shaft 40.

Also rotatably supported on the input shaft 20 is a fifth ratio input gear 62. This gear 62 meshes with a fifth ratio output gear 64 which is rotatably secured with the output shaft 40. The fifth ratio input gear 62 is selectively connectible with the input shaft 20 by a synchronizer assembly 66.

Figure 3:
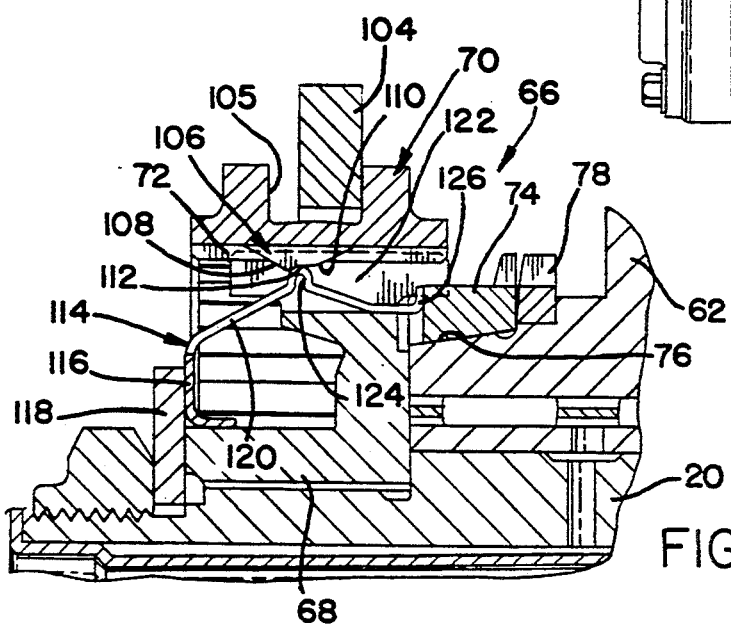
FIG. 3 is an enlarged view of a portion of the fifth ratio synchronizer and reverse actuator shown in FIGS. 1 and 2.

The fifth ratio synchronizer assembly 66, as best seen in FIGS. 2 and 3, includes a hub 68 rotatably connected with the input shaft 20. A synchronizer clutch sleeve or collar 70 is slidably disposed on the hub 68 and drivingly connected therewith through a spline connection 72. The clutch sleeve 70 has a conventional blocker or key assembly, not shown, which is adapted to engage a cone clutch 74 which is rotatably supported on a cone surface or section 76 of the fifth ratio input gear 62.

The clutch sleeve 70, as is well known, when shifted rightwardly from the position shown in FIG. 2, will force the cone clutch 74 to engage the cone surface 76 thereby causing the fifth ratio input gear 62 to synchronize with the speed of the input shaft 20. When the speed is synchronized, the cone clutch 74 will cease to rotate relative to the cone surface 76 such that the clutch sleeve 70 can complete its leftward movement to provide an engagement between the sleeve 70 and a toothed element 78 which is secured to the fifth ratio input gear 62. This is a conventional operation of a synchronizer assembly and countershaft gear.

The input shaft 20 has associated therewith a friction clutch (not shown) which is operable to connect the input shaft 20 with an engine (not shown). The friction clutch is controlled through a clutch lever or actuator 80. The actuator 80 is controlled by the vehicle operator to permit connection and disconnection between the input shaft 20 and the engine (not shown). Generally, when the ratio change is to be made in the transmission, the actuator 80 is manipulated such that the engine is disconnected and the input shaft 20 is free to accelerate or decelerate depending upon the direction of the ratio interchange. The acceleration and deceleration of the input shaft 20 is controlled, as is well known, by the cone clutch sections of the various synchronizers.

As best seen in FIGS. 2, 3 and 4, a reverse actuator mechanism is provided which will control the manipulation of a reverse idler gear 82 into mesh with the reverse input gear 30 and a reverse output gear 84 which is secured to the output shaft 40 through the 1–2 synchronizer 46. The gear 82 is slidably disposed on idler shaft 86 which is rotatably supported in the housing 12 and the end cover 14. The gear 82 is manipulated axially on the shaft 86 by a reverse fork or control lever 88.

The lever 88 is pivotally supported on a two-way bracket 90 through a pin 92. The lever 88 has connected therewith an overcenter spring 94 which provides the operator with some amount of shift feel and will also assist in ensuring the completion of the neutral to reverse shift as the spring travels overcenter. These devices are well known and have been utilized in a number of transmissions. The lever 88 has operatively associated therewith a link or rod 96 which is secured to a 5/R shift actuator 98. The actuator 98 is controlled by a manually actuated lever or paddle 100. The paddle 100 is movable between a plurality of actuators for the control of the 1–2 shift, the 3–4 shift and the fifth reverse shift. These actuators and their assemblies and operation is well known.

One such system is shown in U.S. Pat. No. 5,036,721 to Gugin, issued Aug. 6, 1991, and another is shown in U.S. Pat. No. 5,101,680 to Parsons, issued Apr. 7, 1992. These patents are assigned to the assignee of the present invention. One wishing more information on the operation of such shift controls is directed to either of these patents.

The actuator 98 is also secured to a shift rod 102 which has secured thereto a shift fork 104. The shift fork is, as best seen in FIGS. 1 and 3, engaged in a slot 105 formed in the clutch sleeve 70. As the actuator shift rod 102 is moved longitudinally or axially in bearing supports formed in the housing 12 and end cover 14 the fork 104 will manipulate the collar 70 in the same direction as the rod 102. If the rod 102 is moved rightward, the shift fork 104 will move the collar 70 rightward, thereby completing a fifth ratio engagement. The sleeve or collar 70 has a plurality of cams 106 having a pair of side cam ramps 108 and 110 and a central detent portion 112.

An actuator spring 114 is mounted on the hub 68. The actuator spring 114, as best seen in FIG. 4, has an annular portion 116 which is disposed in abutment with a washer 118 secured on the input shaft 20. The spring 114 also has a plurality of axially extending arms 120 which are disposed in complementary slots 122 formed in the hub 68. The spring arms 120, as best seen in FIGS. 2 and 3, have a central hump or detent surface 124 which is engageable by the cam 106 formed on the collar 70.

Each spring arm 120 has an operating end 126 which abuts the cone clutch 74. In the neutral position of the collar 70 shown in FIG. 2, the detent surface 124 is extended radially outward thereby relieving any load which the end 126 might transfer to the cone clutch 74. In this position, the cone clutch 74 is free to rotate relative to the gear 62.

During the selection of fifth gear, the spring arms 120 are not energized by the cam 106. However, on a neutral to reverse manipulation, the cam ramp 108 will cause the spring arms 120 and the surface 124 to move radially inward. Since the annular portion 116 is prevented from moving axially by the washer 118, the arms 120 will extend axially or longitudinally toward the cone clutch 74. This movement of the cone clutch 74 will continue until the collar 70 reaches the position shown in FIG. 3, wherein the detent surface 124 is disposed adjacent the detent 112. At this position, the cone clutch 74 has been fully engaged with the cone surface 76 thereby causing the ratio gear 62 to synchronize with the input shaft 20.

The ratio gear 62 is meshed with the ratio gear 64. Since the gear 64 rotates with the output shaft 40, and since during a neutral to reverse shift the output shaft 40 is stationary, the ratio gear 64 will be stationary. With the ratio gear 64 stationary, the ratio gear 62 will also be stationary and due to the high inertia of the vehicle, cannot be rotated by engagement of the cone clutch 74. Since the lower inertia component within the system will be the input shaft and its related gearing, the input shaft 20 will be brought into speed synchronization with the output shaft 40, which at this point, is zero. Thus, the input shaft 20 and output shaft 40 will both be at zero speed as will the gears 84 and 30. This will permit the reverse idler gear 82 to be meshed with these gears without the buzz associated with transmissions not utilizing a braking apparatus or mechanism during a reverse shift maneuver.

Upon completion of the reverse shift, the collar 70 will be moved leftward past the position shown in FIG. 3, such that the detent surface 124 will be permitted to expand radially outward along the ramp 110, thereby relieving engagement pressure on the cone clutch 74, such that the fifth ratio gear 62 will be free to rotate relative to the input shaft 20.

The rod 96 is disposed in an L-shaped slot 130 formed in the lever 88. This L-shaped slot 130 permits the rod 96 to move freely during rightward movement of the shift rod 102, such that the shift fork 88 will be free from forces during a fifth ratio engagement maneuver. During a reverse maneuver, however, the L-shaped slot 130 cooperates with the rod 96 to enforce pivoting of the shift fork 88 about the pin 92 without binding on the rod 96. Such structures are commonly used in manual transmissions of the type disclosed herein.

The output shaft 40 also has disposed rotatably therewith an output gear 132 which meshes with a differential input gear 134. As is well known, the differential input gear will drive the carrier of a differential disposed in the assembly 18 to enforce rotation of a pair of drive shafts 136 and 138, which in turn are connected to drive the wheels of a vehicle (not shown).

It should be appreciated from the foregoing description that a simple mechanism has been provided to enforce the synchronization of the input and output shafts of a countershaft transmission during a neutral-reverse shift maneuver. The use of the fifth ratio synchronizer to provide this speed synchronization eliminates the need for additional cone clutches being installed within the transmission thereby reducing the assembly time and cost.

The spring member 114 is a simple stamped construction which can be readily manufactured without significant cost. The hub 68 of the synchronizer 66 has the slots 122 formed therein at the point of manufacture during the cutting of the spline teeth. Thus, there is not significant cost associated with the introduction of the spring 114 and its accompanying components.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A brake actuator in combination with a transmission for retarding rotation of an input shaft during a shift maneuver from neutral to reverse comprising:
    a synchronizer means for connecting a forward ratio gear means in torque transmitting relation between the input shaft and another shaft,
    said synchronizer means including a selectively operable friction cone clutch and a shift collar operable upon movement in a first direction to operate said synchronizer means to establish the forward ratio and movable in a second direction during a neutral to reverse shift; and
    a spring disposed between said shift collar and said friction cone clutch and cooperating with said shift collar for engaging said friction cone clutch with said forward ratio gear means to retard said input shaft during a portion of the neutral to reverse shift and for releasing said friction cone clutch upon completion of neutral to reverse shift, the spring comprising an annular portion abutting an axially stationary member on said input shaft and a plurality of axially extending arms each having an operating end disposed in abutment with said cone clutch and an actuating portion intermediate the annular portion and the operating ends disposed for engagement by an inner surface of the shift collar.

2. A brake actuator in combination with a transmission for retarding rotation of an input shaft during a shift maneuver from neutral to reverse comprising:
    a synchronizer means for connecting a forward ratio gear means in torque transmitting relation between the input shaft and an output shaft,
    said synchronizer means including a selectively operable cone clutch means, a cone surface on a gear member of the forward ratio gear means, and a shift collar operable upon movement in a first direction to operate said synchronizer means to establish the forward ratio and movable in a second direction during a neutral to reverse shift, said shift collar having an actuating surface disposed on a radially inward surface thereof; and
    a spring disposed on said shift collar and having an annular abutment portion, arm means extending from and integral with the abutment portion for abutting said cone clutch means and cooperating with said actuating surface on said shift collar for enforcing engagement of said cone clutch means with said cone surface to retard said input shaft during a portion of the neutral to reverse shift and said actuating surface releasing said spring to permit disengaging of said cone clutch means upon completion of neutral to reverse shift.

3. A brake actuator in combination with a transmission for retarding rotation of an input shaft during a shift maneuver from neutral to reverse comprising:
    a synchronizer means for connecting a forward ratio gear means in torque transmitting relation between the input shaft and another shaft,
    said synchronizer means including a selectively operable friction clutch means and a shift collar operable upon movement in a first direction to operate said synchronizer means to establish the forward ratio and movable in a second direction during a neutral to reverse shift; and
    a spring disposed between said shift collar and said friction clutch means and cooperating with said shift collar for engaging said friction clutch means, said spring including an annular abutment portion, an actuating portion and an operating portion said actuating and operating portions comprised of three arm members integral with and extending radially and axially from said annular portion and said actuating portion being moved radially inward during movement of said shift collar in the second direction to extend said operating portion axially in the first direction for enforcing the engagement of said friction clutch means.

* * * * *